United States Patent
Chen (10) Patent No.: US 11,050,275 B2
(45) Date of Patent: Jun. 29, 2021

(54) WIRELESS CHARGING DEVICE FOR SUPPORTING AN ELECTRONIC DEVICE

(71) Applicant: Primax Electronics Ltd., Taipei (TW)

(72) Inventor: Bo-An Chen, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 140 days.

(21) Appl. No.: 16/549,109

(22) Filed: Aug. 23, 2019

(65) Prior Publication Data

US 2020/0389037 A1 Dec. 10, 2020

(30) Foreign Application Priority Data

Jun. 6, 2019 (TW) .................................. 108119787

(51) Int. Cl.
*H01M 10/46* (2006.01)
*H02J 7/00* (2006.01)
*H02J 7/02* (2016.01)

(52) U.S. Cl.
CPC ............ *H02J 7/0044* (2013.01); *H02J 7/025* (2013.01)

(58) Field of Classification Search
CPC ...... H02J 7/0044; H02J 7/0042; H02J 7/0045; H02J 50/10; H02J 2310/22; H05K 7/1401; H05K 5/0017; H03K 17/96; F16B 2/12

USPC .............. 320/107, 108, 114, 115; 248/316.1, 248/316.2, 316.4, 316.6
See application file for complete search history.

(56) References Cited

U.S. PATENT DOCUMENTS

| | | | |
|---|---|---|---|
| 2017/0110902 A1* | 4/2017 | Miller | H02J 7/0044 |
| 2019/0198212 A1* | 6/2019 | Levy | B62J 50/225 |
| 2019/0283685 A1* | 9/2019 | Zhang | F16M 11/04 |
| 2020/0254940 A1* | 8/2020 | Dang | H02J 7/0044 |
| 2020/0266660 A1* | 8/2020 | Morrow | H02J 7/342 |

* cited by examiner

*Primary Examiner* — Edward Tso
(74) *Attorney, Agent, or Firm* — Kirton McConkie; Evan R. Witt (57) ABSTRACT

A wireless charging device includes a casing, a triggering switch, a supporting assembly, a clamping mechanism and a control module. The supporting assembly is located at an end of the casing. In response to a weight of an electronic device, the triggering switch is pressed and triggered. When the triggering switch is triggered, a triggering signal is generated. The clamping mechanism is electrically connected with the triggering switch. In response to the triggering signal, the clamping mechanism is moved relative to the casing to clamp the electronic device on the supporting assembly. The control module is connected with the supporting assembly. When the control module is triggered, the triggering switch is not pressed by the supporting assembly and the electronic device is not clamped by the clamping mechanism.

10 Claims, 8 Drawing Sheets

WIRELESS CHARGING DEVICE FOR SUPPORTING AN ELECTRONIC DEVICE

FIELD OF THE INVENTION

The present invention relates to a charging device, and more particularly to a wireless charging device using a wireless charging technology.

BACKGROUND OF THE INVENTION

Nowadays, a variety of commercially-available electronic devices are developed toward small size and light weightiness in order to possess the portability. In addition, the electronic devices have touch screens. By inputting commands through the touch screens, the electronic devices can be operated accordingly. For example, the electronic devices include smart phones, tablet computers, personal digital assistants (PDAs), handheld game consoles (e.g. PSP, NDSL and Gameboy series game consoles), or the like.

Due to the portability of the above electronic devices, these electronic devices cannot be connected with a power source at any time. For providing sufficient electric power to the electronic device, a built-in battery is usually installed in the electronic device. The battery is a chargeable battery. Consequently, the chargeable battery of the portable electronic device may be charged by the user in a place with the power socket.

In case that the residual battery capacity of the electronic device is insufficient, the chargeable battery of the portable electronic device may be charged through a connecting wire. A first end of the connecting wire is plugged into the electronic device, and a second end of the connecting wire is plugged into a power source or a mobile bank that is capable of storing electric power. Under this circumstance, the electric power provided by the power source or the mobile bank is transmitted to the electronic device through the connecting wire in order to charge the battery of the electronic device.

However, the applications of the charging process are usually restricted by the length of the connecting wire. For example, during the process of charging the electronic device, the connecting wire usually becomes hindrance from operating the device or arbitrarily moving the electronic device.

Figure 1:
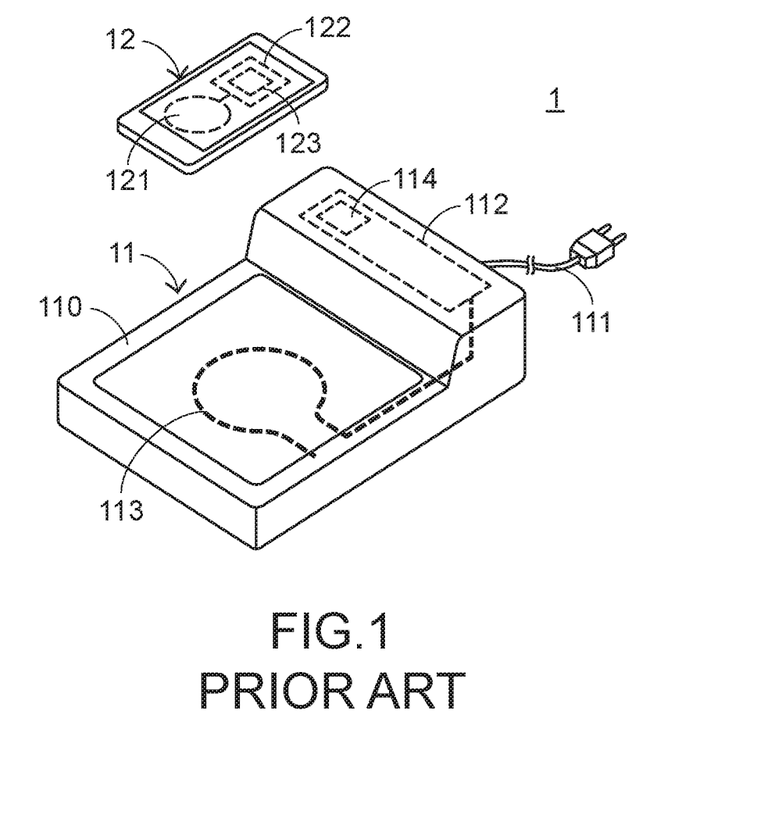
FIG. 1 schematically illustrates a conventional wireless charging device and an electronic device.

With development of a wireless charging technology, a wireless charging device for wirelessly charging the electronic device has been disclosed in order to solve the drawbacks of the wired charging technology of using the connecting wire. FIG. 1 schematically illustrates a conventional wireless charging device and an electronic device. In FIG. 1, the wireless charging device 11 and the electronic device 12 are shown. The wireless charging device 11 comprises a main body 110, a power cable 111, a driving module 112, a transmitter coil 113 and a first communication module 114. The electronic device 12 comprises a casing 120, a receiver coil 121, a receiving module 122, a battery (not shown) and a second communication module 123.

The power cable 11 of the conventional wireless charging device 11 is exposed outside the main body 10. Consequently, the power cable 11 can be connected with a power source (not shown). The driving module 112 and the transmitter coil 13 are both disposed within the main body 10. In addition, the driving module 112 is connected with the power cable 11 and the transmitter coil 13. When the driving module 112 is driven by the power source, the driving module 112 generates an electric current. When the electric current flows through the transmitter coil 13, magnetic induction or magnetic resonance occurs. In response to the magnetic flux generated through the magnetic induction or the magnetic resonance, the transmitter coil 13 outputs a corresponding electric power. The first communication module 114 of the wireless charging device 11 and the second communication module 123 of the electronic device 12 are in communication with each other in order to perform the subsequent wireless charging operation. On the other hand, the receiver coil 21 is disposed within the casing 120 of the conventional electronic device 12 for receiving the electric power from the transmitter coil 113 through the magnetic induction or the magnetic resonance. The battery is connected with the receiving module 122. After the electric power is received by the receiver coil 21, the electric power is stored in the battery so as to be utilized.

Generally, the main body 110 of the conventional wireless charging device 11 is designed to have a platform profile. In addition, the volume of the main body 110 of the conventional wireless charging device 11 is larger than the casing 120 of the conventional electronic device 12 in order to facilitate the user to place the conventional electronic device 12 thereon. During the process of transmitting the electric power from the conventional wireless charging device 11 to the conventional electronic device 12, the receiver coil 121 within the conventional electronic device 12 should be purposely placed at a position near the transmitter coil 113 of the conventional wireless charging device 11. That is, for allowing the receiver coil 121 to receive the electric power, the transmitter coil 113 should be aligned with the receiver coil 121 as precisely as possible.

Generally, during the charging process, the user still needs to use the electronic device. When the electronic device is placed on the platform-shaped main body of the wireless charging device, the line of the user's vision cannot be in parallel with the display screen of the electronic device. In other words, the conventional wireless charging device is not user-friendly. For overcoming this drawback, a wireless charging device is disclosed in Chinese Patent Publication No. CN108668522. The platform of the wireless charging device for placing the electronic device can be lifted. Since the line of the user's vision can be in parallel with the display screen of the electronic device, the wireless charging device is operated more conveniently. However, this wireless charging device still has some drawbacks. For example, the electronic device cannot be firmly fixed on the wireless charging device.

Therefore, there is a need of providing a wireless charging device capable of fixing an electronic device.

SUMMARY OF THE INVENTION

An object of the present invention provides a wireless charging device capable of fixing an electronic device.

Another object of the present invention provides a wireless charging device, in which the position of an electronic device is adjustable according to a size of the electronic device.

In accordance with an aspect of the present invention, a wireless charging device is provided for supporting an electronic device and transmitting electric power to the electronic device in a wireless transmission manner. The wireless charging device includes a casing, a triggering switch, a supporting assembly, a clamping mechanism and a control module. The triggering switch is disposed within the casing. When the triggering switch is triggered, a triggering signal is generated. The supporting assembly is located at an end of the casing and arranged near the triggering switch. The supporting assembly is used for supporting the electronic device. In response to a weight of the electronic device, the triggering switch is pressed and triggered. The clamping mechanism is disposed on the casing and electrically connected with the triggering switch. In response to the triggering signal, the clamping mechanism is moved relative to the casing to clamp the electronic device on the supporting assembly. The control module is disposed within the casing, partially exposed outside the casing, and connected with the supporting assembly. When the control module is triggered, the triggering switch is not pressed by the supporting assembly and the electronic device is not clamped by the clamping mechanism.

In an embodiment, the supporting assembly includes a triggering frame, a linking plate, a supporting body and at least one elastic element. The triggering frame is installed on the casing and arranged near the triggering switch. As the triggering frame is moved relative to the casing in a first axial direction, the triggering switch is selectively triggered or not triggered. The linking plate is located over the triggering frame and connected with the control module. When the control module is triggered, the linking plate is moved relative to the triggering frame in a second axial direction. The supporting body is arranged between the triggering frame and the linking plate, and partially exposed outside the first end of the casing to support the electronic device. In response to the weight of the electronic device, the supporting body is moved relative to the casing in the first axial direction. The at least one elastic element is arranged between the casing and the triggering frame, and providing an elastic force to the triggering frame. In response to the elastic force, the triggering frame is moved relative to the casing in the first axial direction and the triggering switch is no longer triggered. As the linking plate is moved, the linking plate is selectively combined with or separated from the supporting body.

In an embodiment, the control module includes a control key and a control unit. The control key is exposed outside the casing and arranged near the linking plate. When the control key is pressed, the control key is moved relative to the casing, the linking plate is correspondingly moved with the control key, and a first control signal is generated. The control unit is electrically connected with the control key, the triggering switch and the clamping mechanism. In response to the first control signal, the control unit generates a second control signal to the clamping mechanism, so that the clamping mechanism is controlled to stop clamping the electronic device for a predetermined time period.

If the control unit detects that the triggering switch is still pressed after the clamping mechanism has stopped clamping the electronic device for the predetermined time period, the clamping mechanism is controlled to clamp the electronic device again. Whereas, if the control unit detects that the triggering switch is not pressed after the clamping mechanism has stopped clamping the electronic device for the predetermined time period, the clamping mechanism is controlled to stop clamping the electronic device continuously.

From the above descriptions, the present invention provides the wireless charging device. The triggering switch, the supporting assembly, the clamping mechanism and the control module of the wireless charging device cooperate with each other. Consequently, the function of detecting whether the electronic device is placed on the supporting body of the supporting assembly and the function of automatically driving the clamping mechanism to fix the electronic device on the supporting body are achieved. Moreover, the user may press the control key of the control module to achieve the following functions. Firstly, the electronic device is no longer clamped by the clamping mechanism. Secondly, the supporting body and the linking plate are temporarily separated from each other. Consequently, the supporting body is movable relative to the casing in the vertical direction, and the relative positions between the electronic device and the wireless charging module of the wireless electronic device are adjustable.

Moreover, the wireless charging device is designed to have the profile of a support stand. When the electronic device is clamped by the clamping mechanism, the display screen of the electronic device can be in parallel with the line of the user's vision. Consequently, the electronic device can be operated in a user-friendly manner. In another embodiment, the wireless charging device is further equipped with a rotating shaft. The main body of the wireless charging device is rotatable about the rotating shaft. Since the rotating angle of the wireless charging device can be adjusted according to the user's requirements, the display screen of the electronic device can be adjusted to be in parallel with the line of the user's vision as possible.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a wireless charging device in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
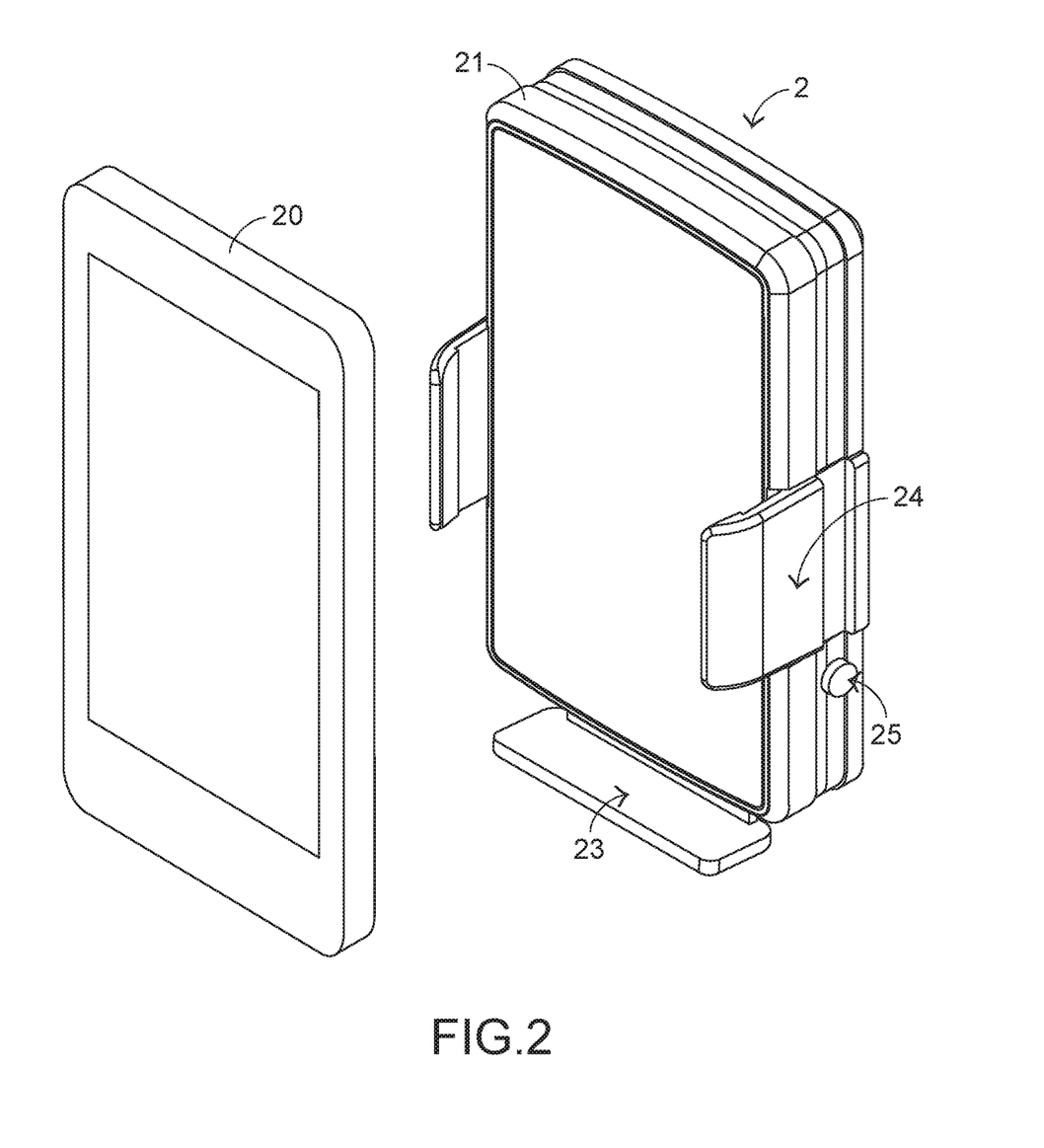
FIG. 2 schematically illustrates the appearances of a wireless charging device and an electronic device according to a first embodiment of the present invention.
Figure 3:
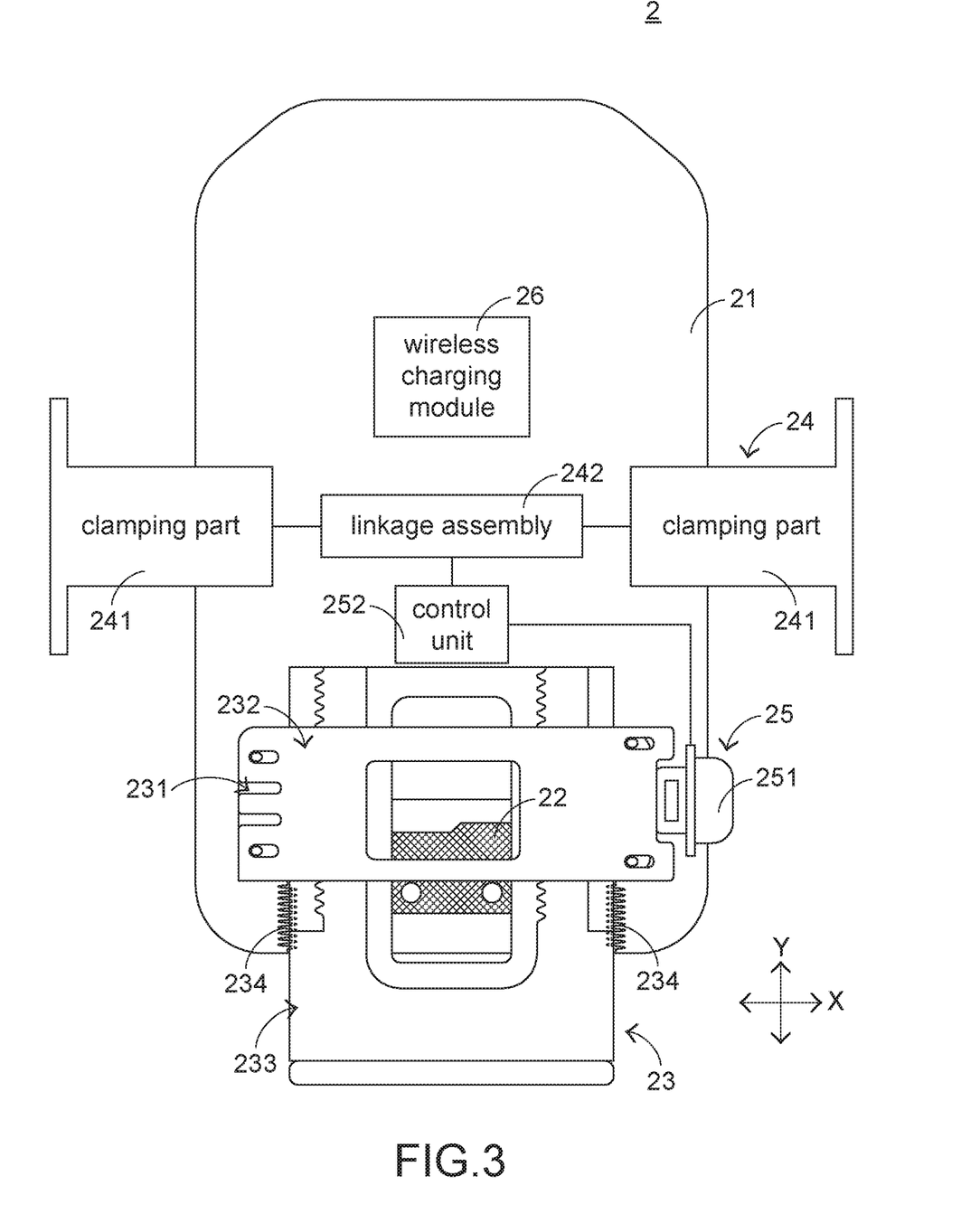
FIG. 3 is a schematic view illustrating a portion of the wireless charging device according to the first embodiment of the present invention.

Please refer to FIGS. 2 and 3. FIG. 2 schematically illustrates the appearances of a wireless charging device and an electronic device according to a first embodiment of the present invention. FIG. 3 is a schematic view illustrating a portion of the wireless charging device according to the first embodiment of the present invention. The wireless charging device 2 is used for supporting the electronic device 20 and transmitting electric power to the electronic device 20 in a wireless transmission manner. The wireless charging device 2 comprises a casing 21, a triggering switch 22, a supporting assembly 23, a clamping mechanism 24, a control module 25 and a wireless charging module 26 (see FIG. 4).

The triggering switch 22 is disposed within the casing 21. When the triggering switch 22 is triggered by the supporting assembly 23, the triggering switch 22 generates a triggering signal. The supporting assembly 23 is located at a first end of the casing 21 and arranged near the triggering switch 22. The supporting assembly 23 is used for supporting the electronic device 20. In response to the weight of the electronic device 20, the supporting assembly 23 is moved downwardly relative to the casing 21 and thus the triggering switch 22 is triggered by the supporting assembly 23. The clamping mechanism 24 is disposed on the casing 21 and electrically connected with the triggering switch 22. In response to the triggering signal, the clamping mechanism 24 is moved relative to the casing 21 in the left direction and the right direction. Consequently, the bilateral sides of the electronic device 20 on the supporting assembly 23 are clamped by the clamping mechanism 24. The control module 25 is installed in the casing 21 and partially exposed outside the casing 21. The control module 25 is connected with the supporting assembly 23. When the control module 25 is triggered, the triggering switch 22 is no longer triggered by the supporting assembly 23. Consequently, the electronic device 20 is no longer clamped by the clamping mechanism 24. The wireless charging module 26 is disposed within the casing 21. The wireless charging module 26 can transmit electric power to the electronic device 20 in a wireless transmission manner. The structure and the operation of the wireless charging module 26 are well known to those skilled in the art, and are not redundantly described herein.

Figure 4:
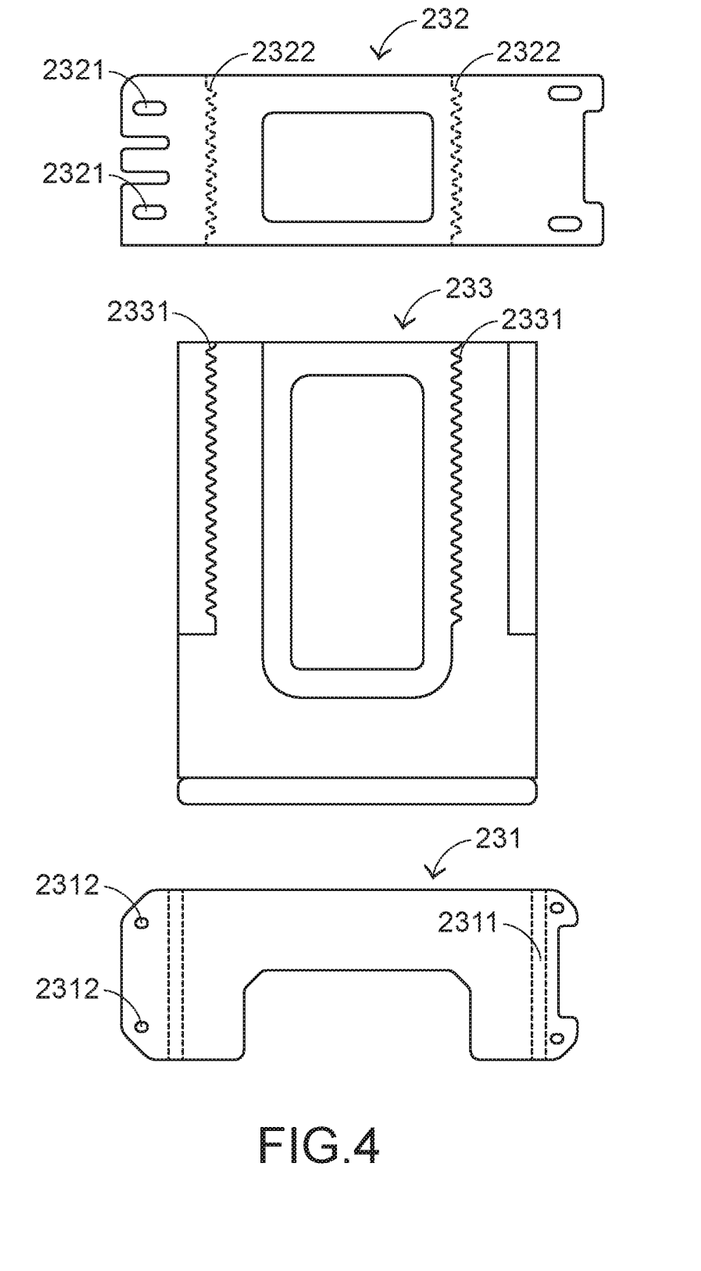
FIG. 4 is a schematic exploded view illustrating a portion of the supporting assembly of the wireless charging device according to the first embodiment of the present invention.
Figure 5A:
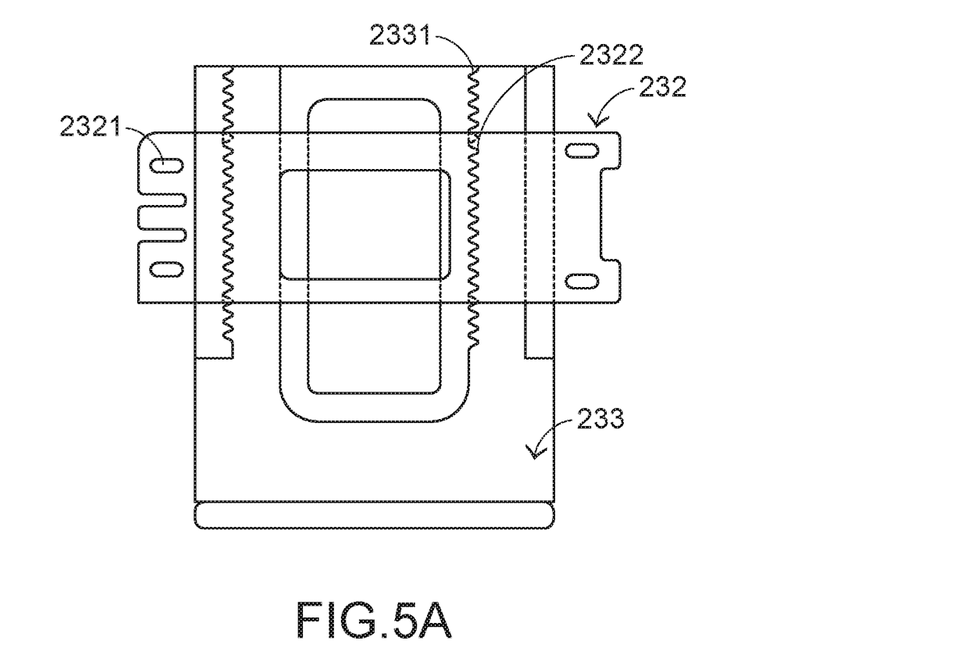
FIGS. 5A to 5D schematically illustrate the operations of the wireless charging device according to the first embodiment of the present invention.
Figure 5B:
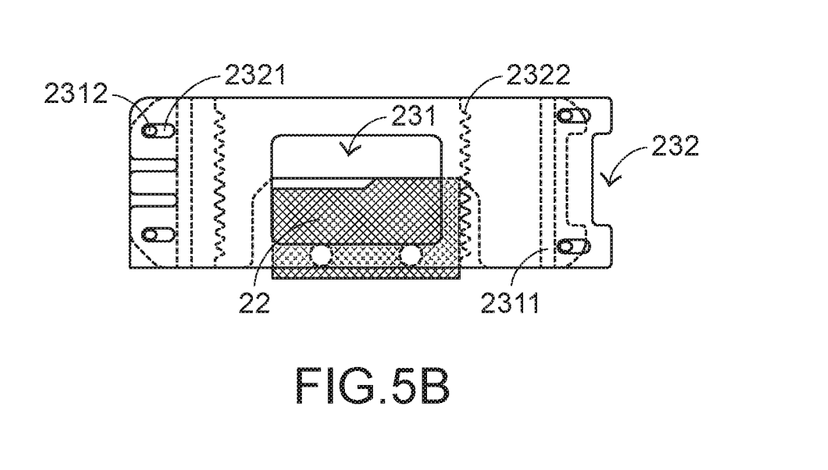
Figure 5C:
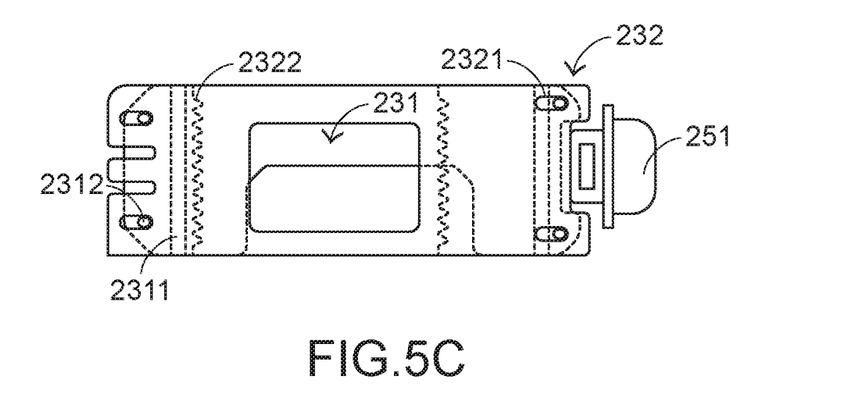
Figure 5D:
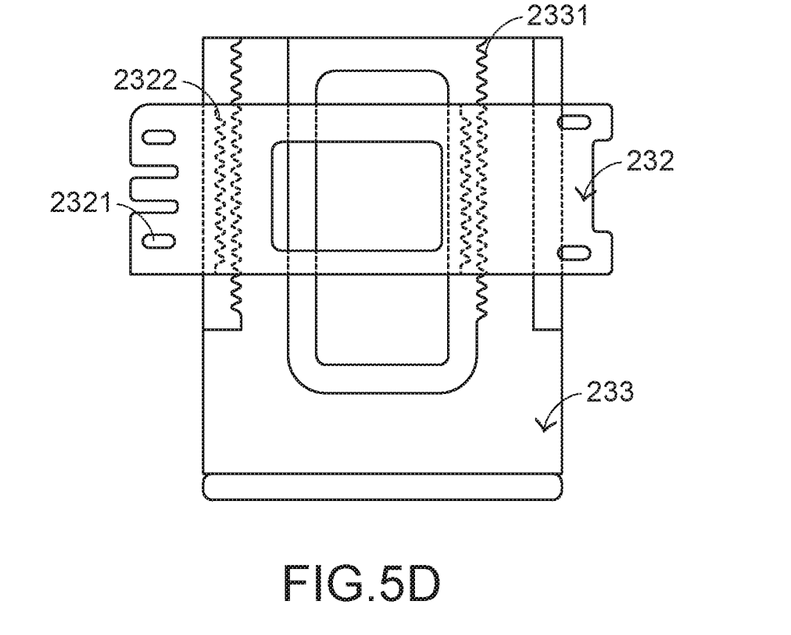

Please refer to FIGS. 2, 3 and 4. FIG. 4 is a schematic exploded view illustrating a portion of the supporting assembly of the wireless charging device according to the first embodiment of the present invention. In an embodiment, the supporting assembly 23 comprises a triggering frame 231, a linking plate 232, a supporting body 233 and plural elastic elements 234. The triggering frame 231 is installed on the casing 21 and arranged near the triggering switch 22. As the supporting body 233 is moved, the triggering frame 231 is moved relative to the casing 21 in a first axial direction Y. Consequently, the triggering switch 22 is selectively triggered or not triggered. The linking plate 232 is located over the triggering frame 231 and connected with the control module 25. When the control module 25 is triggered, the linking plate 232 is movable relative to the triggering frame 231 in a second axial direction X. The supporting body 233 is arranged between the triggering frame 231 and the linking plate 232. Moreover, a portion of the supporting body 233 is exposed outside the first end of the casing 21. The supporting body 233 is used for supporting the electronic device 20 thereon. In response to the weight of the electronic device 20, the supporting body 233 is moved relative to the casing 21 in the first axial direction Y. The plural elastic elements 234 are arranged between the casing 21 and the triggering frame 231. In response to the elastic forces of the plural elastic elements 234, the triggering frame 231 is moved relative to the casing 21 in the first axial direction Y and thus the triggering switch 22 is no longer triggered. In this embodiment, the elastic elements 234 are springs, resilient sheets or any other appropriate objects that can provide elastic forces.

The triggering frame 231 comprises plural guiding tracks 2311 and plural first connection structures 2312. The casing 21 comprises plural guiding grooves corresponding to the plural guiding tracks 2311. For succinctness, the guiding grooves are not shown in the drawings. Due to the cooperation of the plural guiding tracks 2311 and the plural guiding grooves, the triggering frame 231 is movable relative to the casing 21 in the first axial direction Y. The linking plate 232 comprises plural second connection structures 2321 corresponding to the plural first connection structures 2312. The plural first connection structures 2312 and the plural second connection structures 2321 are connected with each other. Consequently, the linking plate 232 and the triggering frame 231 are combined together.

In an embodiment, the first connection structures 2312 are protrusion posts, and the second connection structures 2321 are sliding holes. The protrusion posts are movable along the corresponding sliding holes. Consequently, the linking plate 232 is movable relative to the triggering frame 231 in the second axial direction X. It is noted that the examples of the first connection structures and the second connection structures 2321 are not restricted. For example, in another embodiment, the first connection structures are sliding holes, and the second connection structures are protrusion posts.

Please refer to FIG. 4 again. The supporting body 233 comprises plural first coupling parts 2331. The linking plate 232 comprises plural second coupling parts 2322 corresponding to the plural first coupling parts 2331. When the control module 25 is enabled and the linking plate 232 is moved relative to the triggering frame 231 in the direction toward the supporting body 233, the plural second coupling parts 2322 are correspondingly moved and engaged with the corresponding first coupling parts 2331. Consequently, the linking plate 232 is combined with the supporting body 233 and synchronously moved with the supporting body 233. When the control module 25 is enabled and the linking plate 232 is moved relative to the triggering frame 231 in the direction away from the supporting body 233, the plural second coupling parts 2322 are correspondingly moved and disengaged from the corresponding first coupling parts 2331. Consequently, the linking plate 232 is separated from the supporting body 233. Meanwhile, the supporting body 233 is movable relative to the linking plate 232 in the first axial direction Y. Since the supporting body 233 is movable relative to the linking plate 232, the relative positions between the electronic device 20 and the wireless charging module 26 within the wireless electronic device 2 are adjustable. In case that the receiver coil within the electronic device 20 is adjusted to be close to the wireless charging module 26, the wireless charging efficiency is enhanced. In this embodiment, the first coupling parts 2331 and the second coupling parts 2322 are complementary saw-toothed structures.

Please refer to FIGS. 2, 3 and 4. The control module 25 comprises a control key 251 and a control unit 252. The control key 251 is exposed outside the casing 21 and arranged near the linking plate 232. The control key 251 has the following functions. Firstly, when the control key 251 is pressed and moved relative to the casing 21, the linking plate 232 is correspondingly moved. Secondly, when the control key 251 is pressed, the control key 251 generates a first control signal. The control unit 252 is electrically connected with the control key 251, the triggering switch 22 and the clamping mechanism 24. In response to the first control signal, the control unit 252 issues a second control signal to the clamping mechanism 24. In response to the second control signal, the clamping mechanism 24 stops clamping the electronic device 20 for a predetermined time period. In this embodiment, the control key 251 is a physical key structure that is linked with the linking plate 232.

In an embodiment, the control unit 252 of the control module 25 has the following settings. If the control unit 252 detects that the triggering switch 22 is still pressed after the clamping mechanism 24 has stopped clamping the electronic device 20 for the predetermined time period, the control unit 252 clamps the electronic device 20 again. If the control unit 252 detects that the triggering switch 22 is not pressed after the clamping mechanism 24 has stopped clamping the electronic device 20 for the predetermined time period, the control unit 252 stops clamping the electronic device 20 continuously.

In an embodiment, the clamping mechanism 24 comprises plural clamping parts 241 and a linkage assembly 242. The plural clamping parts 241 are located at two opposite sides of the casing 21. Moreover, the plural clamping parts 241 can be moved relative to the casing 21 in the left direction and the right direction. The linkage assembly 242 is disposed within the casing 21 and connected with the triggering switch 22, the plural clamping parts 241 and the control module 25. The linkage assembly 242 is used for moving the plural clamping parts 241 relative to the casing 21 in the second axial direction X. When the triggering signal is received by the linkage assembly 242, the linkage assembly 242 moves the plural clamping parts 241 relative to the casing 21 in the direction toward the casing 21. Consequently, the electronic device 20 is clamped on the supporting body 233 by the plural clamping parts 241. When the triggering signal is not received by the linkage assembly 242, the linkage assembly 242 moves the plural clamping parts 241 relative to the casing 21 in the direction away from the casing 21. Consequently, the electronic device 20 is no longer clamped by the clamping mechanism 24. Meanwhile, the electronic device 20 can be moved from the supporting body 233. The linkage assembly 242 is a component or a structure that has the linking function. The component or the structure having the linking function is well known to those skilled in the art, and is not redundantly described herein.

The operations of the wireless charging device 2 will be described as follows. FIGS. 5A to 5D schematically illustrate the operations of the wireless charging device according to the first embodiment of the present invention. Please refer to FIGS. 2, 3, 4 and FIGS. 5A to 5D. When the wireless charging device 2 is in an initial status, the plural first coupling parts 2331 of the supporting body 233 and the plural second coupling parts 2322 of the linking plate 232 are engaged with each other. Consequently, the linking plate 232 is combined with the linking plate 232 and synchronously moved with the linking plate 232. For using the wireless charging device 2 to wirelessly charge the electronic device 20, the electronic device 20 has to be placed on the supporting body 233 of the supporting assembly 23. In response to the weight of the electronic device 20, the supporting body 233 is moved downwardly relative to the casing 21. Since the linking plate 232 is combined with the supporting body 233, the linking plate 232 is synchronously moved downwardly with the supporting body 233. Moreover, the triggering frame 231 connected with the linking plate 232 is correspondingly moved downwardly to trigger the triggering switch 22.

When the triggering switch 22 is triggered, a triggering signal is generated and issued to the linkage assembly 242. When the triggering signal is received by the linkage assembly 242, the linkage assembly 242 moves the plural clamping parts 241 relative to the casing 21 in the direction toward the casing 21. Consequently, the electronic device 20 is clamped on the supporting body 233 by the plural clamping parts 241. In such way, the electronic device 20 does not fall down from the wireless charging device 2. Moreover, if the wireless charging module 26 detects the presence of the electronic device 20, the wireless charging module 26 transmits electric power to the electronic device 20 in the wireless transmission manner. Consequently, the wireless charging operation is started. The method of detecting the electronic device 20 by the wireless charging module 26 and the way of wirelessly transmitting the electric power from the wireless charging module 26 to the electronic device 20 are well known to those skilled in the art, and are not redundantly described herein.

Figure 6:
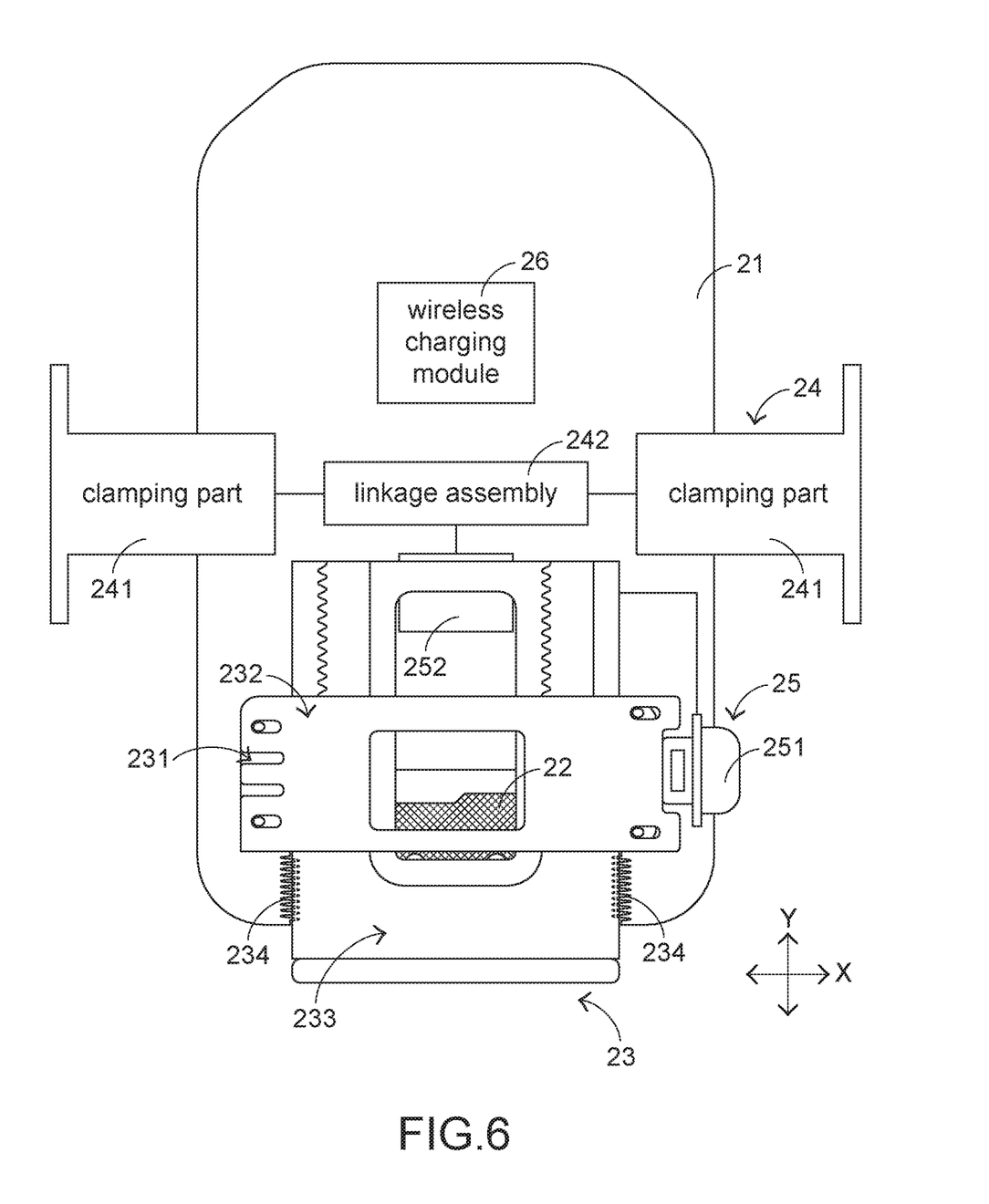
FIG. 6 is a schematic view illustrating a portion of the wireless charging device according to the first embodiment of the present invention, in which the supporting assembly is moved.

FIG. 6 is a schematic view illustrating a portion of the wireless charging device according to the first embodiment of the present invention, in which the supporting assembly is moved. In some situations, the charging speed is slow. In accordance with a reason of causing the slow charging speed, the distance between receiver coil of the electronic device 20 and the wireless charging module 26 of the wireless charging device 2 is very large. Under this circumstance, the wireless charging efficiency is low or the wireless charging operation is not effectively performed. For solving this problem, the user may press the control key 251. After the control key 251 is pressed, the linking plate 232 connected with the control key 251 is moved relative to the triggering frame 231 in the second axial direction X. As the linking plate 232 is moved, the plural second coupling parts 2322 are correspondingly moved and disengaged from the corresponding first coupling parts 2331. Consequently, the linking plate 232 is separated from the supporting body 233. Meanwhile, the user may move the supporting body 233 upwardly or downwardly to adjust the relative positions between the electronic device 20 (on the supporting body 233) and the wireless charging device 2. Consequently, the receiver coil of the electronic device 20 is close to the wireless charging module 26 of the wireless charging device 2.

The following two aspects should be especially described. Firstly, when the control key 251 is pressed, only the linking plate 232 is moved in the second axial direction X. However, the triggering frame 231 connected with the linking plate 232 is not moved upwardly. That is, the triggering switch 22 is continuously pressed by the triggering frame 231, and the electronic device 20 is continuously clamped by the clamping mechanism 24. Secondly, in response to the first control signal, the control unit 252 controls the clamping mechanism to stop clamping the electronic device 20 for a predetermined time period (e.g., 3 seconds). In other words, the action of moving the supporting body 233 has to be performed within the predetermined time period. If the control unit 252 detects that the electronic device 20 is still placed on the supporting body 233 after the clamping mechanism 24 has stopped clamping the electronic device 20 for the predetermined time period, the clamping mechanism 24 is controlled to clamp the electronic device 20 again. Moreover, according to the result of judging whether the triggering switch 22 is pressed, the control unit 252 can judge whether the electronic device 20 is still placed on the supporting body 233.

After the wireless charging process is completed, the user may press the control key 251. After the control key 251 is pressed, the linking plate 232 connected with the control key 251 is moved and the linking plate 232 is separated from the supporting body 233. Moreover, the clamping mechanism 24 stops clamping the electronic device 20. Meanwhile, the electronic device 20 can be removed from the supporting body 233. Since the weight of the electronic device 20 is no longer applied to the supporting body 233, the triggering frame 231 is moved upwardly and returned to its original position in response to the elastic forces of the elastic elements 234. Meanwhile, the triggering switch 22 is not triggered. When the control unit detects that the triggering switch 22 is not triggered, the control unit 252 controls the clamping mechanism 24 to stop clamping the electronic device 20.

Figure 7:
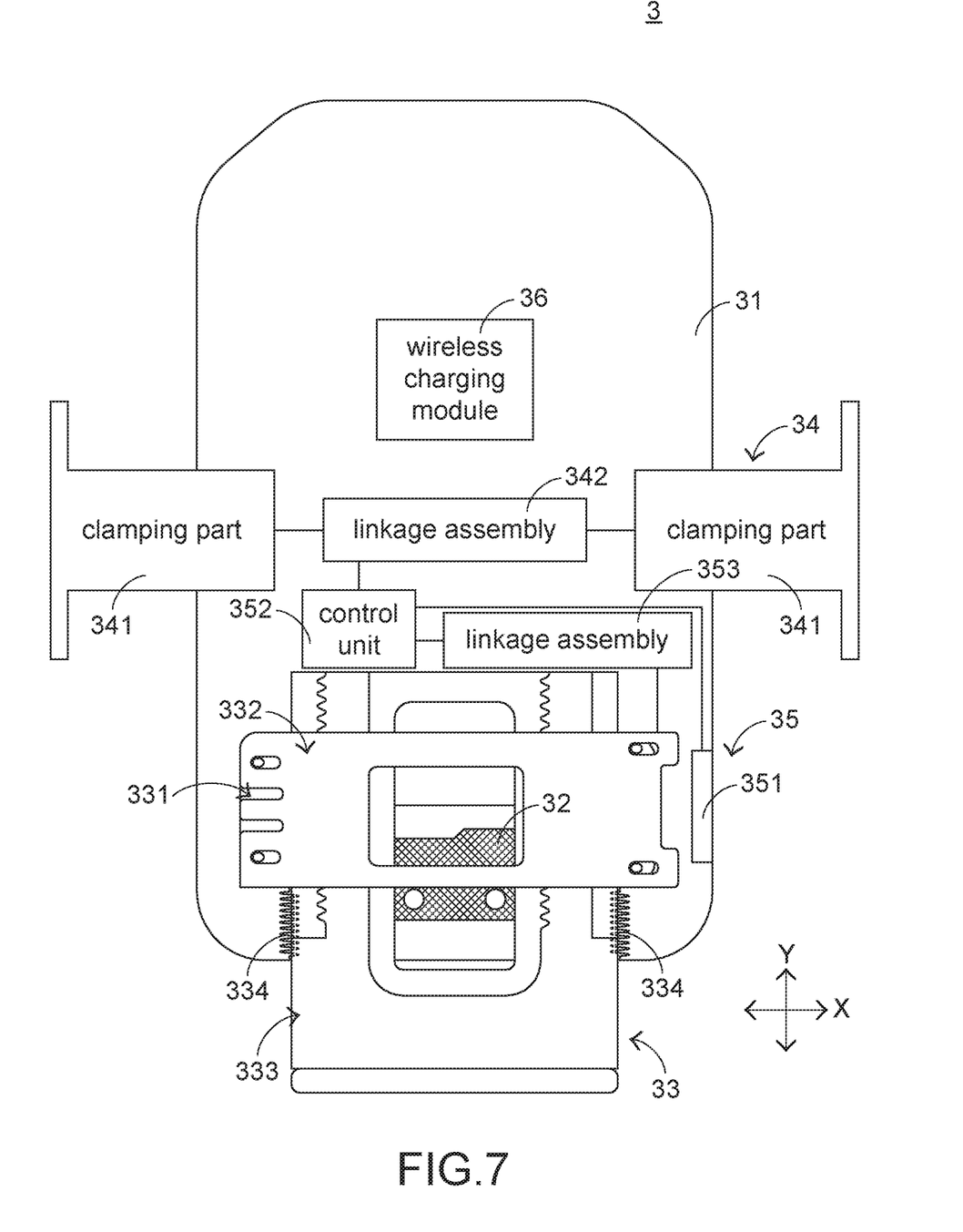
FIG. 7 is a schematic view illustrating a portion of the wireless charging device according to a second embodiment of the present invention.

The present invention further provides a wireless charging device of a second embodiment. FIG. 7 is a schematic view illustrating a portion of the wireless charging device according to a second embodiment of the present invention. The wireless charging device 3 is used for supporting an electronic device (not shown) and transmitting electric power to the electronic device in a wireless transmission manner. The wireless charging device 3 comprises a casing 31, a triggering switch 32, a supporting assembly 33, a clamping mechanism 34, a control module 35 and a wireless charging module 36.

In an embodiment, the supporting assembly 33 comprises a triggering frame 331, a linking plate 332, a supporting body 333 and plural elastic elements (not shown). The supporting body 333 comprises plural first coupling parts 3331. The linking plate 332 comprises plural second coupling parts 3321. The clamping mechanism 34 comprises plural clamping parts 341 and a linkage assembly 342. In comparison with the first embodiment, the constituents and operations of the control module 35 of this embodiment are distinguished. The structures and functions of the other components are similar to those of the first embodiment, and are not redundantly described herein.

In an embodiment, the control module 35 comprises a control key 351, a control unit 352 and a linkage assembly 353. The control key 351 is exposed outside the casing 31. When the control key 351 is pressed, a first control signal is generated. The control unit 352 is electrically connected with the control key 351, the triggering switch 32 and the plural clamping parts 341 of the clamping mechanism 34. In response to the first control signal, the control unit 352 issues a second control signal to the linkage assembly 342. In response to the second control signal, the clamping mechanism 34 stops clamping the electronic device 20 for a predetermined time period. The linkage assembly 353 is connected with the control unit 352 and the linking plate 332. In response to the second control signal, the linkage assembly 353 drives the movement of the linking plate 332. Consequently, the linking plate 332 is separated from the triggering frame 331. In this embodiment, the control key 351 is a touch-type key. In other words, the constituents and operations of the control module 35 are somewhat different from those of the control module 25 of the first embodiment. The linkage assembly 353 is a component or a structure that has the linking function. The component or the structure having the linking function is well known to those skilled in the art, and is not redundantly described herein.

From the above descriptions, the present invention provides the wireless charging device. The triggering switch, the supporting assembly, the clamping mechanism and the control module of the wireless charging device cooperate with each other. Consequently, the function of detecting whether the electronic device is placed on the supporting body of the supporting assembly and the function of automatically driving the clamping mechanism to fix the electronic device on the supporting body are achieved. Moreover, the user may press the control key of the control module to achieve the following functions. Firstly, the electronic device is no longer clamped by the clamping mechanism. Secondly, the supporting body and the linking plate are temporarily separated from each other. Consequently, the supporting body is movable relative to the casing in the vertical direction, and the relative positions between the electronic device and the wireless charging module of the wireless electronic device are adjustable.

Moreover, the wireless charging device is designed to have the profile of a support stand. When the electronic device is clamped by the clamping mechanism, the display screen of the electronic device can be in parallel with the line of the user's vision. Consequently, the electronic device can be operated in a user-friendly manner. In another embodiment, the wireless charging device is further equipped with a rotating shaft. The main body of the wireless charging device is rotatable about the rotating shaft. Since the rotating angle of the wireless charging device can be adjusted according to the user's requirements, the display screen of the electronic device can be adjusted to be in parallel with the line of the user's vision as possible.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device for supporting an electronic device and transmitting electric power to the electronic device in a wireless transmission manner, the wireless charging device comprising:

a casing;

a triggering switch disposed within the casing, wherein when the triggering switch is triggered, a triggering signal is generated;

a supporting assembly located at an end of the casing and arranged near the triggering switch, and supporting the electronic device, wherein in response to a weight of the electronic device, the triggering switch is pressed and triggered;

a clamping mechanism disposed on the casing and electrically connected with the triggering switch, wherein in response to the triggering signal, the clamping mechanism is moved relative to the casing to clamp the electronic device on the supporting assembly; and a control module disposed within the casing, partially exposed outside the casing, and connected with the supporting assembly, wherein when the control module is triggered, the supporting assembly stops pressing and triggering the triggering switch and the clamping mechanism stops clamping the electronic device.

2. The wireless charging device according to claim 1, wherein the supporting assembly comprises:

a triggering frame installed on the casing and arranged near the triggering switch, wherein as the triggering frame is moved relative to the casing in a first axial direction, the triggering switch is selectively triggered or not triggered;

a linking plate located over the triggering frame and connected with the control module, wherein when the control module is triggered, the linking plate is moved relative to the triggering frame in a second axial direction;

a supporting body arranged between the triggering frame and the linking plate, and partially exposed outside the first end of the casing to support the electronic device, wherein in response to the weight of the electronic device, the supporting body is moved relative to the casing in the first axial direction; and at least one elastic element arranged between the casing and the triggering frame, and providing an elastic force to the triggering frame, wherein in response to the elastic force, the triggering frame is moved relative to the casing in the first axial direction and the triggering switch is no longer triggered, wherein as the linking plate is moved, the linking plate is selectively combined with or separated from the supporting body.

3. The wireless charging device according to claim 2, wherein the supporting body comprises at least one first coupling part, and the linking plate comprises at least one second coupling part corresponding to the at least one first coupling part, wherein when the control module is enabled and the at least one second coupling part is engaged with the at least one second coupling part, the linking plate is combined with the supporting body and synchronously moved with the supporting body in the first axial direction, wherein when the control module is enabled and the at least one second coupling part is disengaged from the at least one second coupling part, the linking plate is separated from the supporting body and the linking plate and the supporting body are movable relative to the casing.

4. The wireless charging device according to claim 2, wherein the control module comprises:

a control key exposed outside the casing and arranged near the linking plate, wherein when the control key is pressed, the control key is moved relative to the casing, the linking plate is correspondingly moved with the control key, and a first control signal is generated; and a control unit electrically connected with the control key, the triggering switch and the clamping mechanism, wherein in response to the first control signal, the control unit generates a second control signal to the clamping mechanism, so that the clamping mechanism is controlled to stop clamping the electronic device for a predetermined time period.

5. The wireless charging device according to claim 4, wherein if the control unit detects that the triggering switch is still pressed after the clamping mechanism has stopped clamping the electronic device for the predetermined time period, the clamping mechanism is controlled to clamp the electronic device again, wherein if the control unit detects that the triggering switch is not pressed after the clamping mechanism has stopped clamping the electronic device for the predetermined time period, the clamping mechanism is controlled to stop clamping the electronic device continuously.

6. The wireless charging device according to claim 2, wherein the control module comprises:

a control key exposed outside the casing, wherein when the control key is pressed, a first control signal is generated;

a control unit electrically connected with the control key, the triggering switch and the clamping mechanism, wherein in response to the first control signal, the control unit generates a second control signal to the clamping mechanism, so that the clamping mechanism is controlled to stop clamping the electronic device for a predetermined time period; and a first linkage assembly connected with the control unit and the linking plate, wherein in response to the first control signal, the first linkage assembly is enabled to move the linking plate.

7. The wireless charging device according to claim 6, wherein if the control unit detects that the triggering switch is still pressed after the clamping mechanism has stopped clamping the electronic device for the predetermined time period, the clamping mechanism is controlled to clamp the electronic device again, wherein if the control unit detects that the triggering switch is not pressed after the clamping mechanism has stopped clamping the electronic device for the predetermined time period, the clamping mechanism is controlled to stop clamping the electronic device continuously.

8. The wireless charging device according to claim 1, wherein the clamping mechanism comprises:

plural clamping parts located at two opposite sides of the casing, and movable relative to the casing; and a second linkage assembly disposed within the casing, and connected with the triggering switch, the plural clamping parts and the control module, wherein when the triggering signal is received by the second linkage assembly, the second linkage assembly moves the plural clamping parts relative to the casing in a second axial direction, so that the electronic device is clamped on the supporting assembly by the plural clamping parts, wherein when the triggering signal is not received by the second linkage assembly, the second linkage assembly moves the plural clamping parts relative to the casing, so that the electronic device is not clamped by the plural clamping parts.

9. The wireless charging device according to claim 8, wherein the control module comprises:

a control key exposed outside the casing and arranged near the supporting assembly, wherein when the control key is pressed, the control key is moved relative to the casing, the supporting assembly is correspondingly moved with the control key, and a first control signal is generated; and a control unit electrically connected with the control key, the triggering switch and the second linkage assembly, wherein in response to the first control signal, the control unit generates a second control signal to the second linkage assembly, so that the second linkage assembly drives the plural clamping parts to stop clamping the electronic device for a predetermined time period.

10. The wireless charging device according to claim 8, wherein the control module comprises:

a control key exposed outside the casing, wherein when the control key is pressed, a first control signal is generated;

a control unit electrically connected with the control key, the triggering switch and the clamping mechanism, wherein in response to the first control signal, the control unit generates a second control signal to the clamping mechanism, so that the clamping mechanism is controlled to stop clamping the electronic device for a predetermined time period; and a first linkage assembly connected with the control unit and the supporting assembly, wherein in response to the first control signal, the first linkage assembly is enabled to move the supporting assembly.

\* \* \* \* \*